(12) United States Patent
Calise et al.

(10) Patent No.: US 6,332,105 B1
(45) Date of Patent: Dec. 18, 2001

(54) NEURAL NETWORK BASED AUTOMATIC LIMIT PREDICTION AND AVOIDANCE SYSTEM AND METHOD

(75) Inventors: Anthony J. Calise, Atlanta; Jonnalagadda V. R. Prasad, Roswell, both of GA (US); Joseph F. Horn, State College, PA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/576,369

(22) Filed: May 22, 2000

Related U.S. Application Data
(60) Provisional application No. 60/135,264, filed on May 21, 1999.

(51) Int. Cl.[7] ................................................. G06F 7/00
(52) U.S. Cl. ............................ 701/3; 700/48; 244/75 R
(58) Field of Search ................................ 701/3, 4, 5, 6, 701/8, 9, 11, 14; 700/48; 244/175, 75 R (56) References Cited

U.S. PATENT DOCUMENTS

| | | | |
|---|---|---|---|
| 5,412,756 | * | 5/1995 | Alspector et al. ................. 395/24 |
| 6,064,924 | * | 5/2000 | Fleischmann ...................... 701/3 |
| 6,195,590 | * | 2/2001 | Lastisse .............................. 701/3 |
| 6,195,598 | * | 2/2001 | Bosgui et al. ...................... 701/3 |
| 6,259,975 | * | 7/2001 | Rollel et al. ....................... 701/3 |

* cited by examiner

Primary Examiner—Richard M. Camby
(74) Attorney, Agent, or Firm—Thomas, Kayden, Horstemeyer & Risley LLP (57) ABSTRACT

A method for performance envelope boundary cueing for a vehicle control system comprises the steps of formulating a prediction system for a neural network and training the neural network to predict values of limited parameters as a function of current control positions and current vehicle operating conditions. The method further comprises the steps of applying the neural network to the control system of the vehicle, where the vehicle has capability for measuring current control positions and current vehicle operating conditions. The neural network generates a map of current control positions and vehicle operating conditions versus the limited parameters in a pre-determined vehicle operating condition. The method estimates critical control deflections from the current control positions required to drive the vehicle to a performance envelope boundary. Finally, the method comprises the steps of communicating the critical control deflection to the vehicle control system; and driving the vehicle control system to provide a tactile cue to an operator of the vehicle as the control positions approach the critical control deflections.

37 Claims, 9 Drawing Sheets

NEURAL NETWORK BASED AUTOMATIC LIMIT PREDICTION AND AVOIDANCE SYSTEM AND METHOD

CLAIM OF PRIORITY

This application claims priority to copending U.S. provisional application entitled, "Method and Algorithms for Neural Network Based Automatic Limit Prediction and Avoidance" having Ser. No. 60/135,264, filed May 21, 1999, which is entirely incorporated herein by reference.

STATEMENT REGARDING FEDERALLY SPONSORED RESEARCH OR DEVELOPMENT

The U.S. government has a paid-up license in this invention and the right in limited circumstances to require the patent owner to license others on reasonable terms as provided for by the terms of NCC2-945 awarded by the NASA and U.S. Army Research Office.

TECHNICAL FIELD

The present invention is generally related to vehicle control systems and, more particularly, is related to a system and method for using a neural network to provide predictive vehicle performance envelope limit information.

BACKGROUND OF THE INVENTION

Modern rotorcraft are constrained by a variety of complex limits, or boundaries, on their flight envelopes. Often the onset of such limits are difficult to detect and not easily perceived by the pilot. It is common practice to impose simplified operational limits that restrict the true performance and maneuverability of the aircraft. The need to monitor operational limits using conventional cues such as cockpit instruments can result in excessive pilot workload. In some cases, direct sensor measurement of a limit may not be available.

A flight envelope limiting or carefree handling control system must perform two functions: (1) detection; and (2) limit avoidance. The system must detect the encroachment of an envelope limit, and then it must take appropriate action to prevent the violation of the limit.

There are two current methods proposed to overcome the problem of envelope limiting. One known approach is to take advantage of modern fly-by-wire (FBW) control Systems and use sensor-feedback to prevent limit violation. This form of "carefree" control is currently used on modern fixed-wing aircraft and is being studied for use on helicopters and advanced V/STOL aircraft. Such studies are discussed in the following three references, which are herein fully incorporated by reference, Howett, J., "Carefree Handling for Super-Agility", American Helicopter Society Aero Mechanics Specialists Conference, Fairfield County, Conn., October 1995; King, D. W., et al., "V-22 Load Limiting Control law Development", American Helicopter Society 49th Annual Forum, St. Louis, Miss., May 1993; and Miller, D. G. and Black, T. M. "Tilt Rotor Control Law Design for Rotor Loads Alleviation Using Modern Control Techniques", American Control Conference, June 1991. More specifically, this approach has been applied to fixed-wing aircraft for load factor and stall protection, as disclosed in Corps, S. G., "Airbus A320 Side Stick and Fly By Wire—an Update", proceedings of SAE 5th Aerospace Behavioral Engineering Technology Conference, Long Beach, Calif. 1987; and Ilopueaife, O., "Design of Deep Stall Protection for the C-17A", AIAA Guidance, Navigation, and (Control Conference, San Diego, Calif., July 1996, both of which are herein fully incorporated by reference. The "carefree" control is also known to be applied to rotorcraft for torque and rotor speed protection, as disclosed in Howitt, J., "Carefree Maneuvering in Helicopter Flight Control", American Helicopter Society 51st Annual Forum, Ft. Worth, Tex., May, 1995; and Kimball, D. F., "Recent Tilt Rotor Flight Control Law Innovations", 88AHS Journal, 1987, both of which are herein fully incorporated by reference. Similar techniques have been applied for structural load limiting control laws on vehicles, such as the V-22 aircraft. This approach has been shown to effectively prevent envelope violations in a way that is transparent to the pilot. However, for some applications, the use of feedback control to provide envelope limiting has certain limitations, including but not limited to: the fact that necessary sensor data is not always available, that limiting feedback can change the response characteristics of the aircraft and thereby confuse the pilot or degrade handling qualities; there is no inherent override capability if the pilot needs to violate a limit in an emergency situation; the pilot may not be aware of approaching limits; and many rotorcraft are not equipped with a full authority FBW control systems. The direct feedback approach tends to further disassociate the pilot from the envelope limits. In fact, the use of fill-authority FBW control system introduces new envelope limit problems in the form of control saturation limits.

In such a system, the normal control response of the aircraft will be altered resulting in either a reduction in stick sensitivity or an effective deadband in control response.

An alternative known approach to limit avoidance is to provide some form of enhanced cueing to the pilot. Simulation studies have shown that tactile feedback in the pilot control inceptors is the most effective means of envelope limit cueing, as disclosed in Whalley, M. S. in Achache, M. "Joint U.S./France Investigation of Helicopter Flight Envelope Limit Cueing", American Helicopter Society 52nd Annual Forum, Washington, D.C., June 1996; and Whalley, M. S., "A Piloted Simulation Investigation of a Helicopter Limit Avoidance System Using a Polynomial Neural Network", NASA/TM-1988–112220, January 1998, both of which are herein incorporated by reference.

The tactile cueing can take the form of a "soft stop" in the force-feel curve of the control stick. When using such an approach it is critical to ensure that the cueing clearly enunciates the onset of the limit while not distracting from the performance of the pilot task.

As such, when using a pilot cueing system, it is desirable that the limit detection algorithm estimate future values of a limited parameter in order to provide a sufficient time margin for the pilot to react to the cue. Certain combinations of large control inputs might create a situation where a limit violation is unavoidable. Because there is a time lag between the pilot control input and the aircraft response, a limit avoidance cueing system based on instantaneous data would allow such input and therefore would not be a reliable envelope protection system.

Thus, it is desirable to achieve a prediction lead time. This approach has the advantage that the pilot has overriding capability to exceed the limit in an emergency. The disadvantage of this approach is that limits may still be easily exceeded if the pilot is distracted and workload may be increased if pilot attention is required to monitor the cueing device.

In either of the methods discussed above, it is necessary to extract some sort of information about the limited parameter, using sensor data, in order to cue the pilot or to drive the flight control system. In some cases, the desired information is not directly obtainable from available sensors. Furthermore, if a particular parameter changes rapidly, instantaneous sensor data may not be effective as the flight control system or pilot cueing cannot respond quickly enough to prevent the limit from being exceeded.

Thus, it is desirable to develop a system that can predict the future value of a limited parameter based on the available sensor data and current control positions. Such a system must be constructed based on data from a flight test aircraft or from an accurate simulation model.

The feasibility of using neural networks to synthesize complex envelope limit information and to provide control limit information has been demonstrated in the field.

Two factors drive the demand for the use of neural networks in conjunction with envelope protection systems. One driving factor is the need to synthesize limit information where there is no direct sensor measurement. Another factor is the need to predict the future response of a limit parameter in order to have adequate lead time to avoid the limit.

Studies have shown the capability of neural networks to synthesize complex loads data by training the network with flight test data from instrumented aircraft, such as disclosed in Haas, D. J., Flitter, L. A., and Milano, J., "Helicopter Flight Data Feature Extraction or Component Load Monitoring", AIAA 35$^{th}$ Structures, Structural Dynamics, and Materials Conference, Hilton Head, S.C., April 1994; and Haas, D. J., McCool, K., and Flitter, L. A., "Development and Flight Test Evaluation of a Rotor System Load Monitoring Technology", American Helicopter Society 54$^{th}$ Annual Forum, Washington, D.C. May 1998, which are herein fully incorporated by reference.

In these studies, neural networks were trained to generate instantaneous data. It was shown that a prediction lead time can be obtained by training the neural network to model future values of a parameter by using a time shift in the input and output training data. Selection of the time shift is not trivial, and the optimal value may vary with flight conditions or type of limit.

Another approach is to use algorithms that predict the quasi-steady-state (or dynamic trim) value of a limited parameter. A neural network can be used to model a mapping between the pilot controls and the aircraft limits in dynamic trim. Dynamic trim estimation provides the maximum possible lead time by predicting the final value of the limited parameter step response. An approximate inversion of the network then reveals the control displacements that will cause the aircraft to reach an envelope boundary. This approach has been used to provide angle of attack and load factor limit cueing through the longitudinal stick on the V-22 aircraft, as discussed in Horn, J., Calise, A. C., Prasad, J. V. R. and O'Rourke, M. "Flight Envelope Cueing on a Tilt Rotor Aircraft Using Neural Network Limit Prediction", American Helicopter Society 54$^{th}$ Annual Forum, Washington, D.C., May 1998, the disclosure of which is herein incorporated by reference.

The system was demonstrated in piloted simulation and shown to substantially improve both useable agility and flight safety. A similar system was applied to provide envelope limiting on the XV-15 aircraft and was demonstrated in batch simulations, as disclosed in Horn, J., Calise, A. C., and Prasad, J. V. R., "Flight Envelope Limiting Systems Using Neural Networks", AIAA Atmospheric Flight Mechanics Conference, Boston, Mass., August 1998, the disclosure of which is herein incorporated by reference).

However, there are two main restrictions on the dynamic trim estimation approach to envelope protection. One restriction is that the dynamic trim estimation approach requires accurate models of the dynamic trim characteristics over all possible flight conditions. Secondly, the method is not effective for parameters that tend to overshoot their steady-state value, and exceed limits in the transient response.

As such, extensions to the dynamic trim estimation algorithm to address these limitations are desirable.

SUMMARY OF THE INVENTION

The present invention provides a system and method for using a neural network to provide predictive vehicle performance envelope limit information.

The present invention can be viewed as providing a method for performance envelope boundary cueing for a vehicle control system, comprising the steps of formulating a prediction system for a neural network and training the neural network to predict values of limited parameters as a function of current control positions and current vehicle operating conditions. The method further comprises the steps of applying the neural network to the control system of the vehicle, where the vehicle has capability for measuring current control positions and current vehicle operating conditions. The neural network generates a map of current control positions and vehicle operating conditions versus the limited parameters in a pre-determined vehicle operating condition. The method estimates critical control deflections from the current control positions required to drive the vehicle to the vehicle performance envelope boundary. Finally, the method comprises the steps of communicating the critical control deflection to the vehicle control system; and driving the vehicle control system to provide a tactile cue to an operator of the vehicle as the control positions approach the critical control deflections.

Briefly described, in architecture, the system comprises the following. A vehicle comprises a vehicle operating condition sensor and a current controller position sensor. A neural network is trained to generate a map of current controller positions and vehicle operating conditions versus pre-determined limited parameters in a pre-determined operating condition. A limit margin estimator determines controller deflections from the current controller positions that will result in the vehicle reaching the vehicle performance envelope boundary. Critical limit selection logic determines critical controller deflections from the current controller positions required to drive the vehicle to the vehicle performance envelope boundary. The vehicle further comprises a tactilely adjustable controller, wherein deflection of the controller is inhibited as the deflection approaches at least one of the critical control deflections from at least one of the current control positions.

Other systems, methods, features, and advantages of the present invention will be or become apparent to one with skill in the art upon examination of the following drawings and detailed description. It is intended that all such additional systems, methods, features, and advantages be included within this description, be within the scope of the present invention., and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

The present invention provides vehicle performance envelope boundary cueing using a neural network and limit detection algorithms which predict future values of a limited parameter for given pilot control inputs. The system inversely calculates estimates of control deflections which will cause the parameter to reach a specified envelope boundary at some future time. This data may then be used to drive, for example, a variable force-feel system to cue the pilot of the approaching boundary, or limit, before it is exceeded. Here, an adaptive scheme is developed, which uses sensor data to correct the prediction algorithm, so the system handles variations in mass properties and model uncertainties at the cost of additional sensors.

Another algorithm is developed to handle parameters which tend to impinge on envelope limits in the transient response. This approach uses simplified linear models to estimate the peak response characteristics of a limited parameter.

Figure 1:
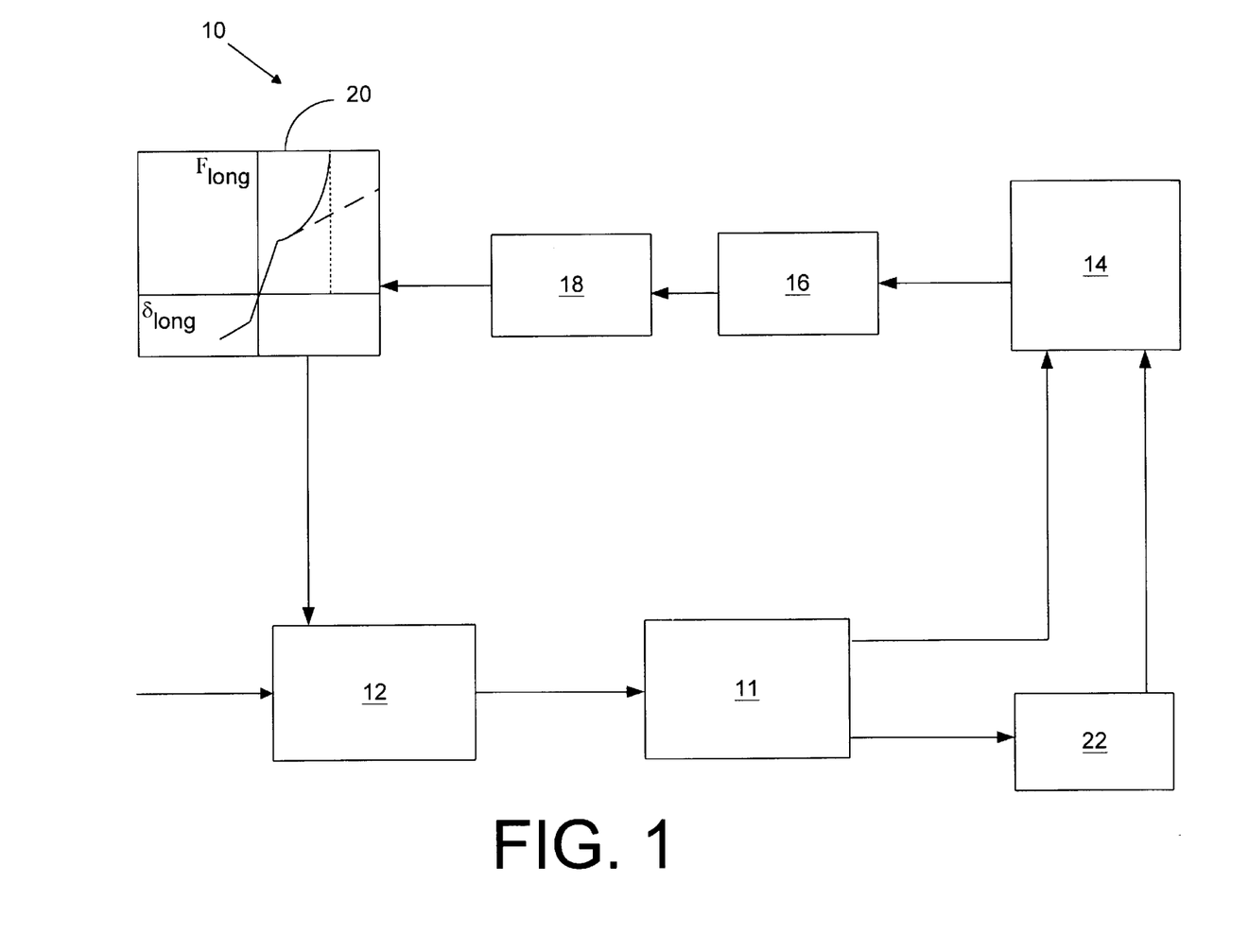
FIG. 1 is a schematic view of an embodiment of the control system of the present invention.

FIG. 1 illustrates a schematic of an embodiment of an overall limit avoidance system 10 of the present invention as implemented on a vehicle 11 controlled via a control system 12. The vehicle 11 includes sensors for measuring current operating (flight) conditions, for example, flight conditions, or aircraft states, and current control positions. This information is communicated to a neural network 14. Before implementation in the system 10, a neural network 14 is trained off-line with simulation data to create a non-linear map of control deflections and the current operating conditions versus limit parameters in a pre-determined operating condition, such as quasi-steady maneuvering flight, which will be discussed further below. The neural network 14 communicates with a limit margin estimator 16, which estimates the control deflections that will cause the aircraft to reach a limit boundary once it reaches a maneuvering steady state condition. The neural network 14 is perturbed to generate a linearized representation of the map of control deflections versus the change in the limited parameter. A pseudo-inverse of the linearized map is generated and used by critical limit selection logic 18 to estimate the critical control deflections required to reach each limit boundary. From this information, a stick force-feel curve 20 is generated and used to drive the variable force-feel system 12 to give a vehicle operator, such as a pilot, a strong tactile cue that the vehicle is approaching a limit boundary.

This system 10 allows the pilot to fly along the limit boundary, thereby making full use of the maneuvering capability of the aircraft. Before this system 10 can be used, however, the neural network prediction system must be formulated and the neural network 14 trained off-line with simulation data. Such formulation and training will be discussed throughout this disclosure as an angle of attack and load factor limiting system for a tilt rotor aircraft. It should be noted, however, that this system can be applicable to an infinite number of parameters.

Dynamic Trim

First, it should be understood that the concept of dynamic trim is a pre-determined operating condition included in the approach of limit prediction discussed in this disclosure. A dynamic trim condition is considered to be any dynamic flight condition that the pilot is likely to sustain over several seconds in order to maneuver the aircraft. Thus, it can be assumed that angular accelerations are zero during dynamic trim as these parameters will only be large during the transitional part of a maneuver. In forward flight the time rate of change of the aerodynamic angles can be assumed to be zero except in the transient phase of a maneuver. For many flight envelope limits it may be assumed that the aircraft is likely to approach the limits during a sustained maneuver. This is the case for limits associated with high gravity force, "high-g", maneuvering such as an angle-of-attack buffeting limit or maximum normal load factor. If a system is designed to estimate limited flight parameters in dynamic trim, rather than instantaneous parameters, it can effectively predict a limit exceedence as soon as the pilot makes the required control input. The time span in which the transient dynamics occur provides a time buffer in which a cueing system can warn the pilot to take corrective action before the limit is exceeded.

Formulation of a Neural Network Prediction System

There are two steps in the formulation of the neural network prediction system. The first step is to establish a functional dependence of the limited parameters in dynamic trim with a set of measurable state and control variables. This relationship is developed in both general form and in the specific forms applied to predict limits on a tilt-rotor aircraft in forward flight. The functional relationship is to be modeled with a neural network in order to predict the proximity to the limit boundary. The next step is to derive a method for predicting the control deflections required to reach the limit boundaries based on the neural network.

The open-loop equations of motion of the aircraft can be represented by the following non-linear state equations in which we partition the state vector into k "slow" states and n-k "fast" states:

$$\dot{x} = g(x, u) \quad (1)$$

$$\text{where } x = \begin{bmatrix} x_{slow} \\ x_{fast} \end{bmatrix} \in R^n, u \in R^m$$

$$x_{slow} \in R^k, x_{fast} \in R^{n-k}$$

The "slow" states include flight parameters that vary slowly with time, such as airspeed, rate of climb, Euler angles, and altitude, which do not necessarily reach a steady value during maneuvering flight. The "fast" states include flight parameters that vary quickly with time, such as the aircraft angular rates, which tend to quickly reach a steady value during a normal maneuver.

A vector of limited parameters is described by a nonlinear function:

$$y_p = h(x, u) \text{ where } y_p \in R^l \qquad (2)$$

A dynamic trim condition is defined as a quasi-steady maneuver in which the time rate of change of the "fast" states is zero.

$$\begin{bmatrix} \dot{x}_s \\ 0 \end{bmatrix} = g(x, u), y_p = h(x, u) \qquad (3)$$

Assuming the control vector u is known, at any instant in time the above system represents n+l equations with n+k+l unknowns. Therefore, k unknowns can be removed by measuring a vector of k states, $x_m$, the above system is completely determined, and the values of the limited parameters in dynamic trim have an implied functional dependence on the control vector and the vector of measured states.

$$y_p = f(x_m, u) \qquad (4)$$

Thus, a functional relationship between a set of measurable (known) parameters and a set of unmeasurable (unknown) limited parameters in dynamic trim is established. The function in Equation 4 can be highly non-linear and $y_p$ can contain an arbitrarily large number of dimensions. The approximation of such a function represents a suitable application for a neural network.

The approach discussed in Equations 1 thru 4 are applied to establish a functional representation of the angle of attack (AOA) and load factor of a vehicle, for example a V-22 in forward flight. Neural networks are applied to model the function. Two neural networks are developed using slightly different input data in each case.

In the preliminary development the effect of altitude change is neglected. The equations of motion are modeled in this case with eight states and with two limited parameters (AOA and load factor) as outputs:

$$\dot{X} = g(x, u), X = [X_{slow}{}^T X_{fast}{}^T]^T$$

$$X_{slow} = [V\gamma\phi]^T$$

$$X_{fast} = [q\alpha p \, r \, \beta]^T$$

$$u = [\delta_e \delta_c \delta_a \delta_r]^T$$

$$Y_{p=[\alpha Nz]}{}^T = h(x, u) \qquad (5)$$

In this set of equations there are 22 parameters (8 states, 8 state derivatives, 4 controls, and 2 limited parameters) and 10 equations (8 state equations and 2 output equations). In dynamic trim we consider the case where the "fast" state derivatives go to zero:

$$\dot{q} = \dot{\alpha} = \dot{p} = \dot{r} = \dot{\beta} = 0 \qquad (6)$$

This eliminates five unknown parameters. If the four controls, u, and three additional states (V, γ, φ) are measured, ten equations and ten unknown parameters remain, a completely determined system of equations. Assuming the functions in the state equations are smooth and well-behaved, it is mathematically possible to determine the two limited parameters in dynamic trim as a function of the seven measured quantities. In this case the neural network models the following mapping:

$$y_p = f(V, \gamma, \phi, \delta_e, \delta_c, \delta_a, \delta_r) \qquad (7)$$

The seven measured parameters are the inputs to the neural network. The neural network returns the values of the two limited parameters that will be reached once the aircraft reaches dynamic trim.

It is additionally necessary to consider the case in which the altitude or air density, for example, vary greatly during the maneuvers. For example, when an aircraft travels through several thousand feet of altitude, the air density changes alter the dynamics significantly and the neural network must adjust to accurately predict the limited parameters. In this case the number of states is increased to nine:

$$x = [V\gamma q\alpha\phi p \, r \, \beta h]^T \qquad (8)$$

It is desirable to make further assumptions in order to expand the set of "fast" states, and thereby avoid increasing the number of inputs to the neural network (further discussed in the section on neural network training). It can be assumed that bank angle is also a "fast" state. For example, during a turning maneuver, a pilot will typically only achieve high roll rates at the initiation and termination of the maneuver, whereas there will be significant pitch and yaw rates throughout the maneuver. Thus, the "fast" state assumption gives:

$$\dot{q} = \dot{\alpha} = \dot{p} = \dot{r} = \dot{\beta} = \dot{\phi} = 0 \qquad (9)$$

Thus, altitude is included as an additional network input and one other input is eliminated. In this case the lateral control input is eliminated. The lateral control inputs have the smallest influence on the limited parameters in the previous implementation. The neural network approximates the following function:

$$y_p = f(V, \gamma, \phi, h, \delta_e, \delta_c, \delta_r) \qquad (10)$$

In the final application of such a system it may also be necessary to treat weight and balance parameters as additional "slow" states in the derivation (such as gross weight and CG location) as the network needs to adjust for the changes in the aircraft mass parameters. These parameters can then be included as additional inputs.

The Critical Control Margin

The next step is to derive a method for calculating the control deflections required to reach the limit boundary. Variations in the ith limited parameter may be represented by:

$$\Delta y_{p_i} = \frac{\partial f_i}{\partial u} \Delta u + \left( \frac{\partial f_i}{\partial V} \dot{V} + \frac{\partial f_i}{\partial \gamma} \dot{\gamma} + \frac{\partial f_i}{\partial \phi} \dot{\phi} \right) \Delta t \qquad (11)$$

$$= \frac{\partial f_i}{\partial u} \Delta u + \dot{y}_{p_i} \Delta t$$

The set of control vectors along the ith limit parameter boundary can be approximated by a linearized equation:

$$\frac{\partial f_i}{\partial u} \Delta u \approx \Delta y_{p_i} - \dot{y}_{p_i} \Delta t \qquad (12)$$

If the control vector is $u \in R^m$, then the above equation describes a m−1 dimensional plane in m-dimensional space.

The Δu terms that satisfy Equation 12 represent all of the possible control deflections that will cause the aircraft to reach the ith limit boundary once it reaches dynamic trim. The partial derivative term is a row vector that represents the sensitivity of the ith output of the network to each control input, and it may be calculated by perturbing the neural network. The $\Delta y_p$ term represents the difference between the current value of the limited parameter and that at the limit boundary. The Δt term is an arbitrary time margin that may be selected to ensure that the limit is not exceeded when flight conditions V, γ, and φ are varying with time. In the general case, the limit boundary is not static but is state dependent.

The critical control margin vector for the ith limited parameter is taken as the shortest vector from the current control position to the limit boundary described by Equation 12. The shortest vector is calculated by taking a pseudo-inverse of the row vector of partial derivatives of $f$:

$$(\Delta u)_i^* \approx (\Delta y_{p_i} - \dot{y}_{p_i} \Delta t) \begin{bmatrix} \frac{\frac{\partial f_i}{\partial u_1}}{\sum_{j=1}^{m} \left(\frac{\partial f_i}{\partial u_j}\right)^2} \\ \vdots \\ \frac{\frac{\partial f_i}{\partial u_m}}{\sum_{j=1}^{m} \left(\frac{\partial f_i}{\partial u_j}\right)^2} \end{bmatrix} \quad (13)$$

One control margin vector is calculated for each of the limited parameters as defined in equation 13. The vectors are approximate (as the actual system in non-linear) but they become exact as the limit boundary is approached (as Δu*→0, Δu* becomes exact).

The critical control margin can be chosen as the vector of ininimum length out of the control margin vectors associated with each limit. The selected Δu* vector is used to drive the variable force-feel system. A soft stop in the force versus stick position curve is imposed as Δu*→0. Generally, the selection of the most critical control vector and how to drive the force-feel system with the information from the vector is not straightforward. For example, a control axis might have both upper and lower bounds associated with two different limits. In the experimental portion of this study, only one control axis was considered, so the minimum length component in the longitudinal axis was used to drive the cueing system.

Figure 2:
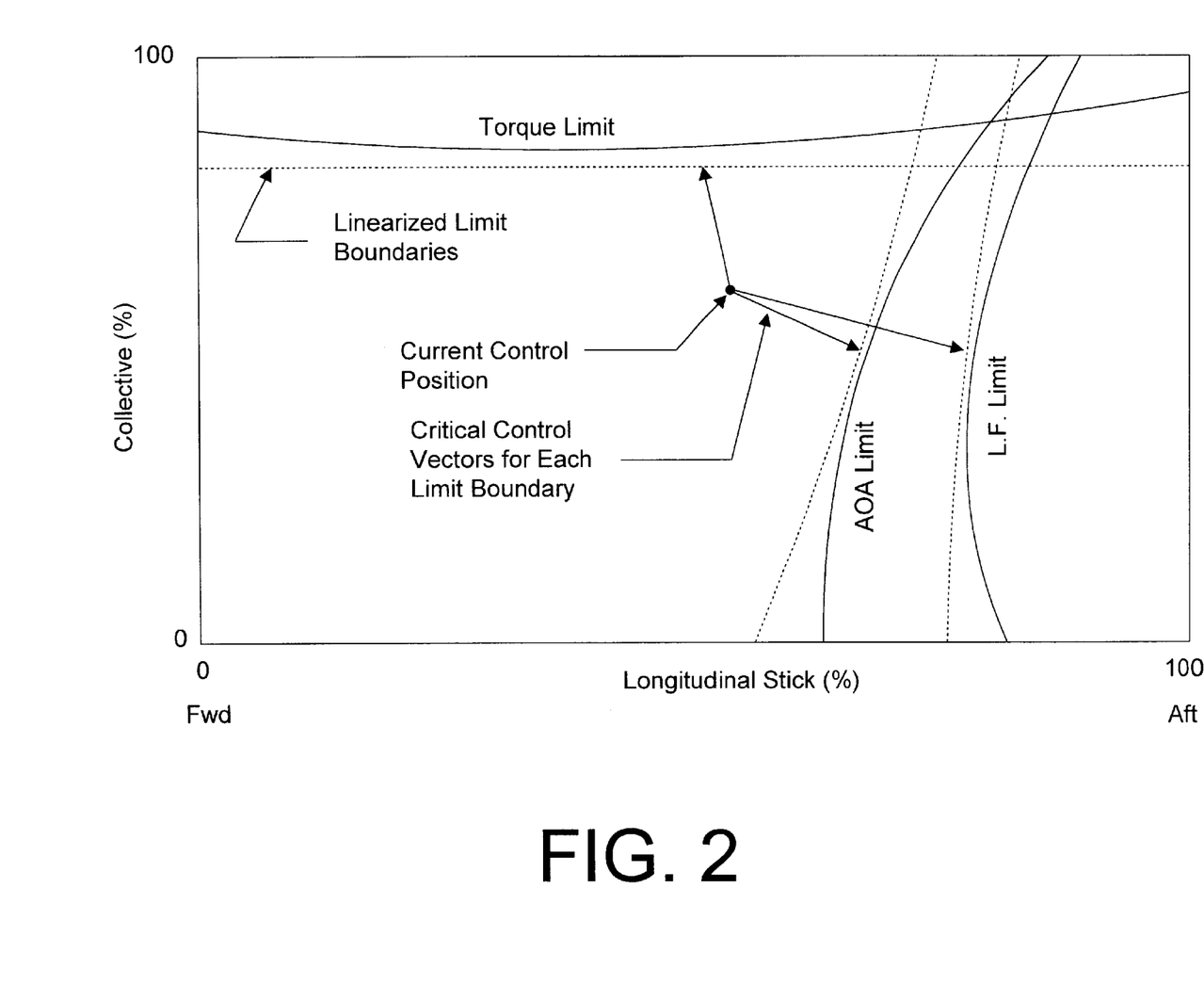
FIG. 2 is a schematic of limit margin approximation applied in the avoidance system of FIG. 1.

FIG. 2 shows schematically the concepts described in Equations 11–13. Here we consider only the longitudinal controls and three limits. The curved lines represent the control vectors along the limit boundaries in terms of the non-linear functions (Equations 7 or 10) holding all other inputs constant. The dashed lines represent the linearized boundaries described by Equation 12. The three arrows represent the control margin vectors that are calculated by Equation 13. The vectors are approximate, but become exact as the limit is approached.

Once the formulation of the neural network is complete, the neural network can be off-line trained.

Neural Network Synthesis and Training

Figure 3:
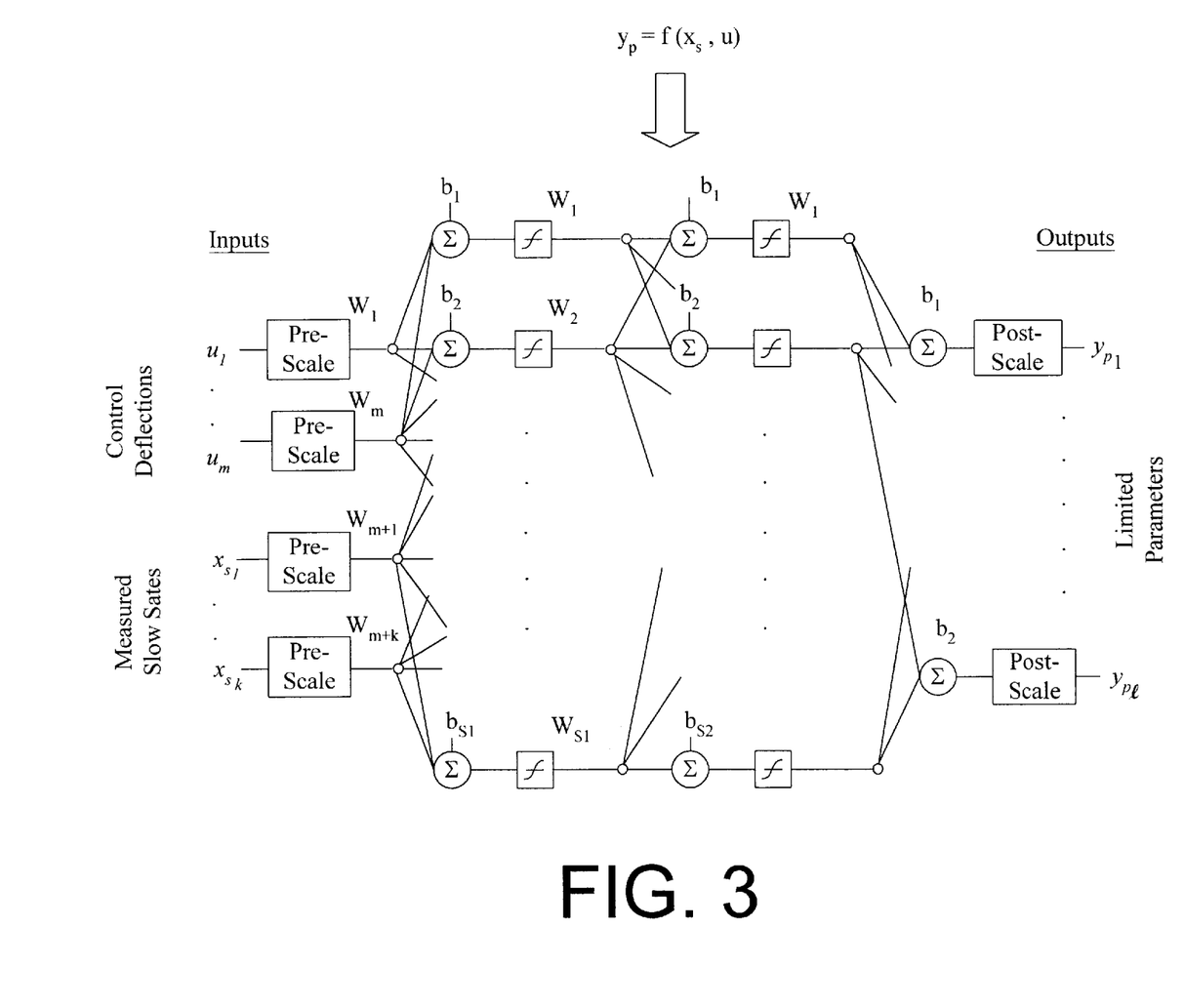
FIG. 3 is a schematic of a neural network architecture applied in the system of FIG. 1.

In one embodiment, a multi-layered feed-forward neural network, with hyperbolic tangent basis function is applied to approximate the function of Equation 4. The general structure of the neural network is illustrated in FIG. 3.

The neural network is trained, for example, but not limited to, using data from the Generic Tilt-Rotor SIMulation model, GTRSIM, such as that disclosed in NASA CR-166536, Rev. A, "A Mathematical Model for Real Time Flight Simulation of Generic Tilt-Roto Aircraft", Sept. 1988, which is herein fully incorporated by reference. The simulation trim routines are modified to generate trim data in quasi-steady maneuvers. The code is also modified to loop through multiple trim points in order to generate training data covering the entire flight envelope that the neural network is modeling.

Figure 4:
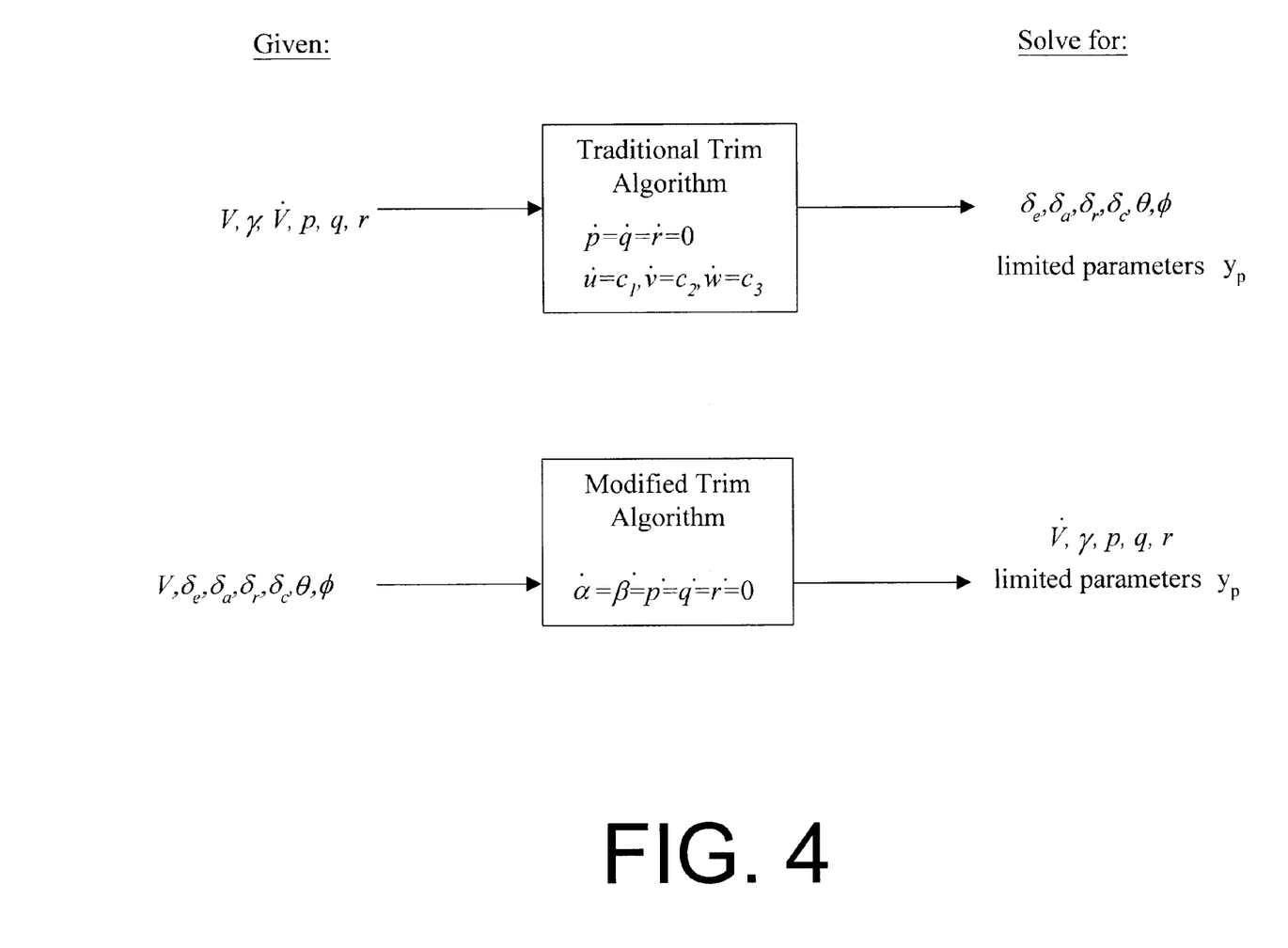
FIG. 4 illustrates a modified trim algorithm applied in a training embodiment of a neural network applied to the system of FIG. 1.

Standard trim algorithms, which calculate aircraft control and attitude based on a prescribed state, are not suitable as trims in maneuvering flight can require control deflections outside of the available range, causing the trim algorithm to fail. A modified trim procedure is used to determine the aircraft state in dynamic trim based on specified control positions and aircraft attitude as illustrated in FIG. 4. The modified trim procedure generates trim points within the valid control range, and the algorithm does not waste computation time trying to calculate invalid trim points.

The selection of trim points used in training can be important, as the number of training points required grows exponentially with the number of desired inputs to the network. If there are n inputs to the network and it is assumed that m points across the range of each input are required to get a good approximation of the variation, then $m^n$ data points are required (for n=7 and m=7, $m^n$=823,543) to get every possible combination. Such large data sets require excessive computation in the training process. The amount of training data can be greatly reduced by using randomly generated trim points rather than a prescribed array. Rather than calculating 7 or 8 trim points regularly spaced across the range of a particular input, fewer trim points (3 or 4) are generated but the specified inputs are randomly perturbed each time. The randomly spaced data fills the input space but with fewer points. The training set is reduced to 3,292 data points instead of 823,543 points.

A code based on the Levenberg-Marquardt algorithm (Demuth, H. and Beale, M., "Neural Network Toolbox for MATLAB", the Mathworks, Inc., Jan. 1994, which is herein fully incorporated by reference) was developed and drove the RMS errors to within 0.25 degrees in angle-of-attach and 0.02 g's in load factor. The training can be conducted a number of times, starting with several random variations in initial weights, and the final weights chosen based on the overall static and dynamic prediction performance of the neural network as illustrated in FIGS. 5 and 6.

Figure 5:
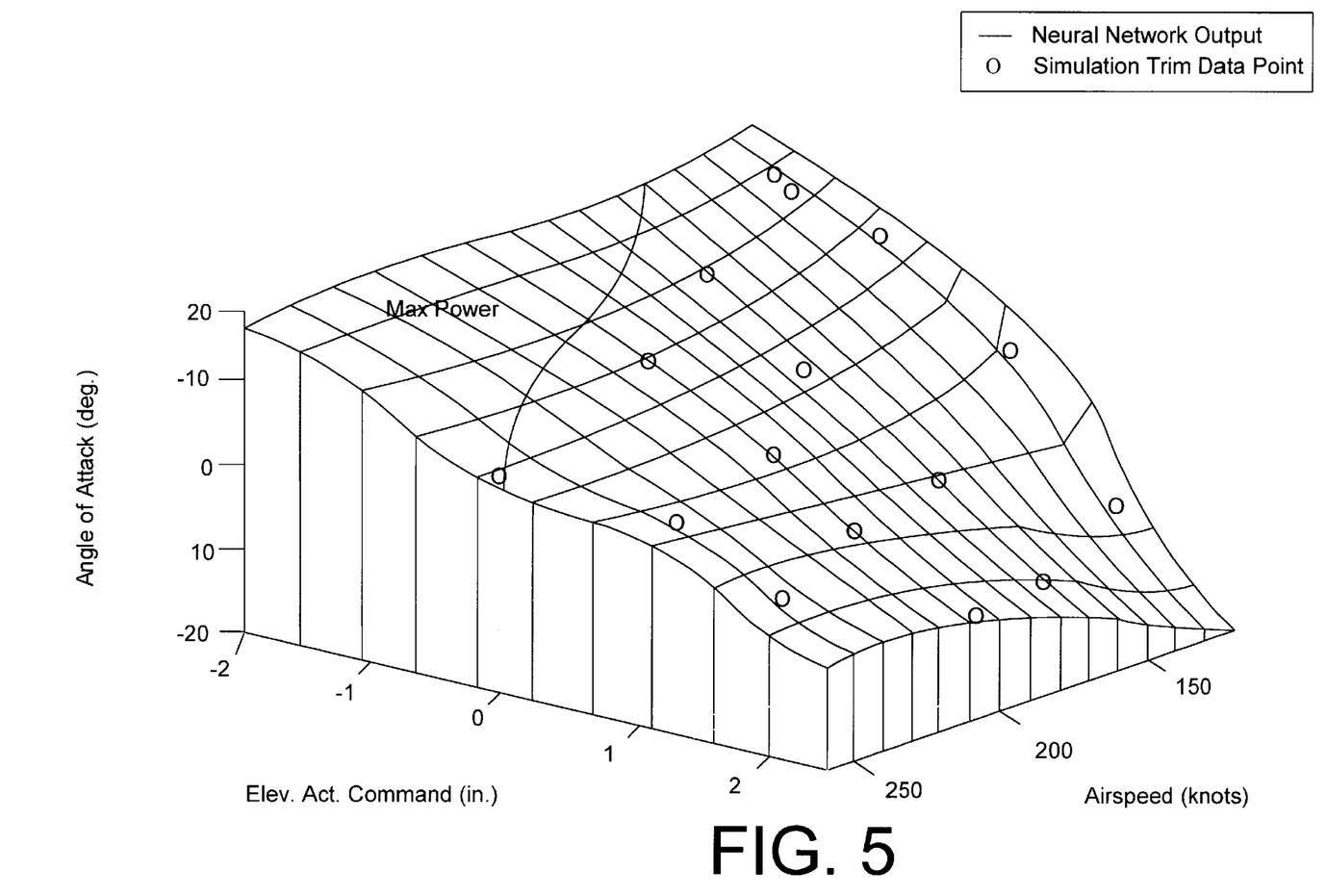
FIG. 5 illustrates a comparison of the neural network output applied in the system of FIG. 1 versus sample simulation trim data points in a constant speed pull-up maneuver.
Figure 6:
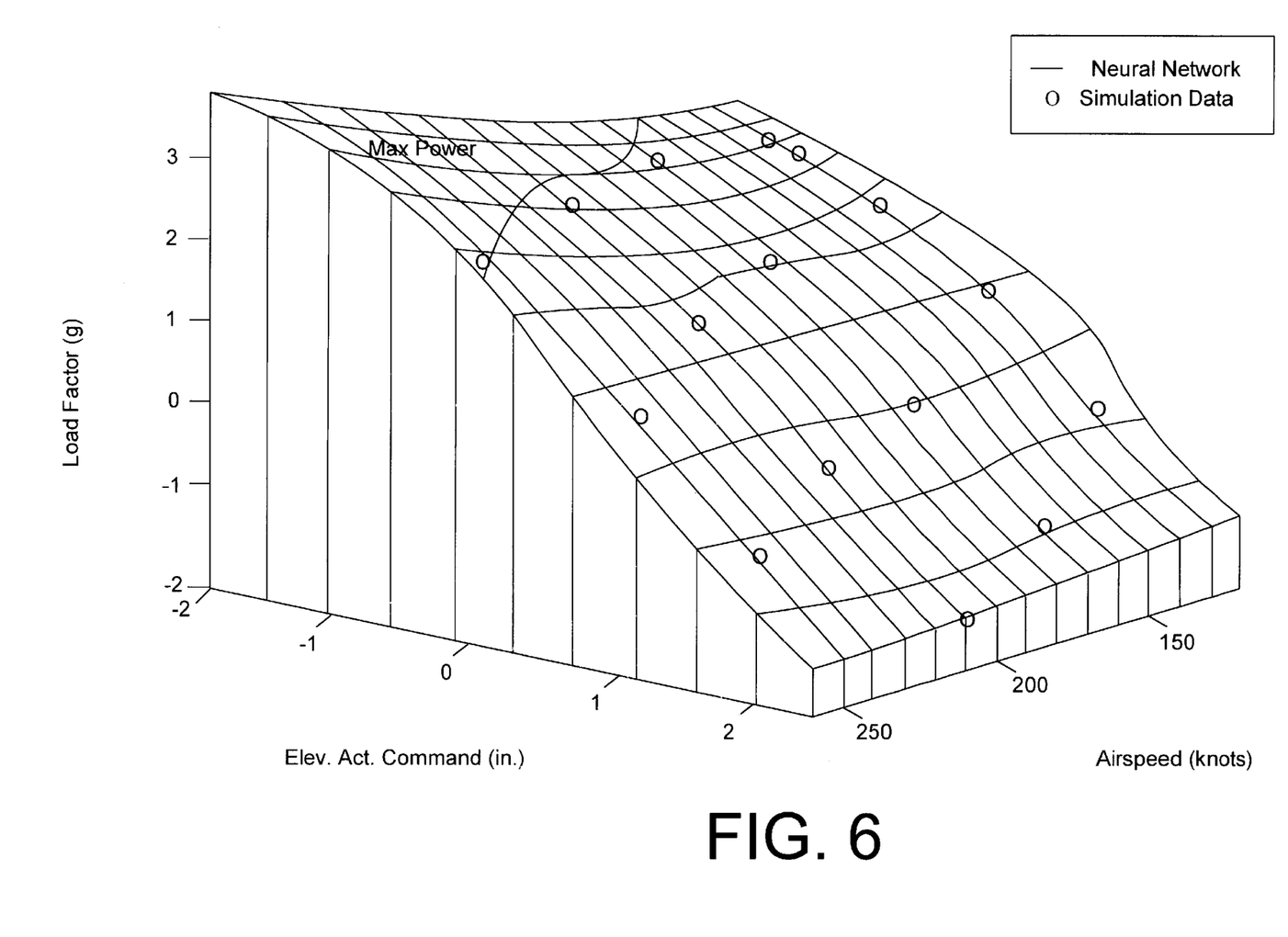
FIG. 6 illustrates a comparison of the neural network output applied in the system of FIG. 1 versus sample simulation trim data points in a constant speed pull-up maneuver.

FIGS. 5 and 6 illustrate a comparison of the neural network output versus sample simulation trim data points in constant speed pull-up maneuvers. The plots show the resulting angle of attack and load factor for various elevator deflections and airspeed with collective set to maintain airspeed. The simulation points are very close to the surface predicted by the neural network even though these points may not be used in training. The close correlation with the data confirms that the training set is adequate, and the smoothness of the surface confirms that there is no overfitting.

Dynamic Performance of the Neural Network

Figure 7:
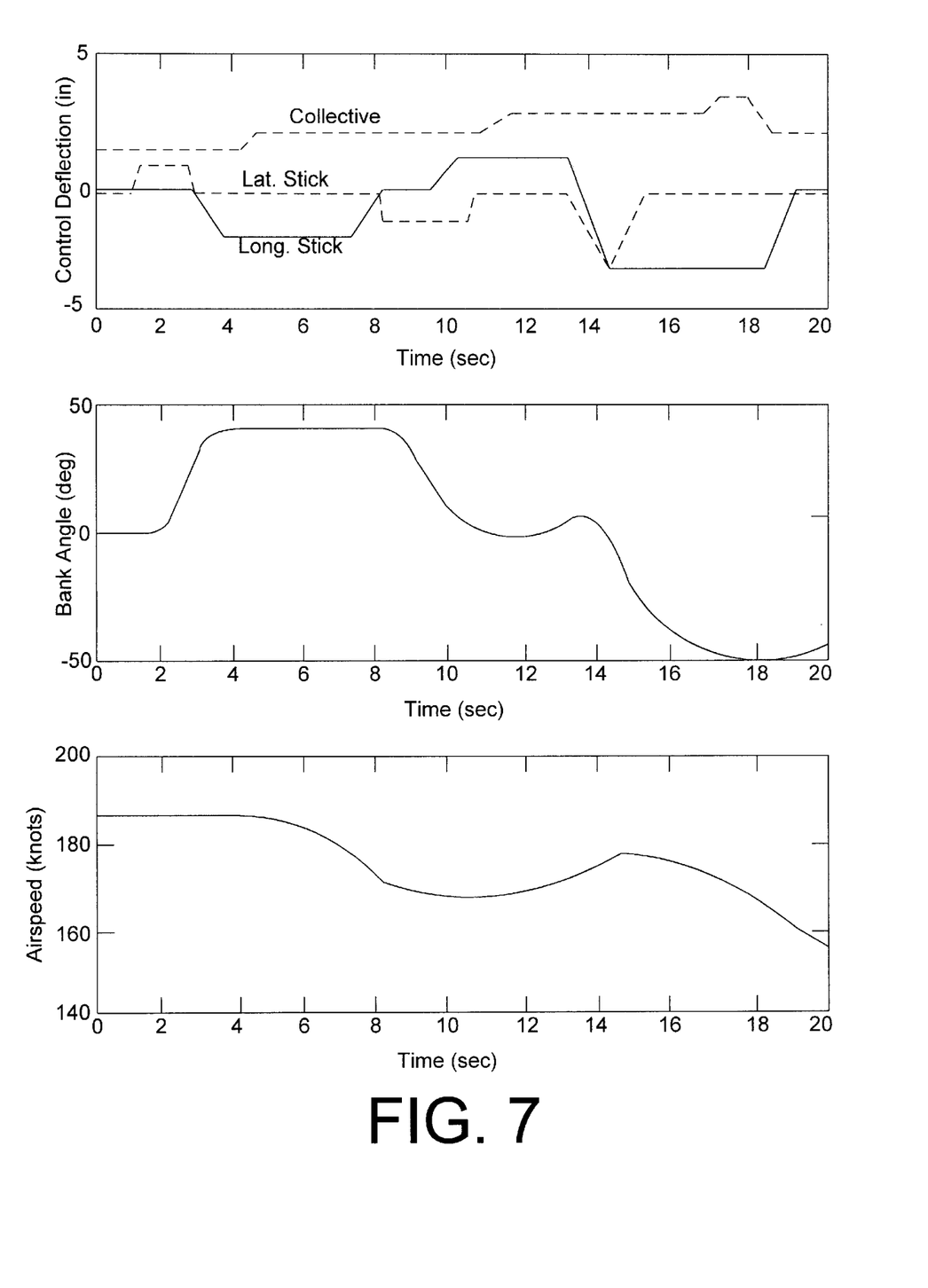
FIG. 7 illustrates a sample test maneuver.

The performance of the neural network prediction can be tested by running dynamic batch simulations of the aircraft for a series of maneuvers, for example, pull-up and banked turn maneuvers, and comparing the neural network response to the simulation response. A sample turn maneuver is illustrated in FIG. 7. This maneuver is used to test the prediction capability only, and no limiting is imposed.

Figure 8:
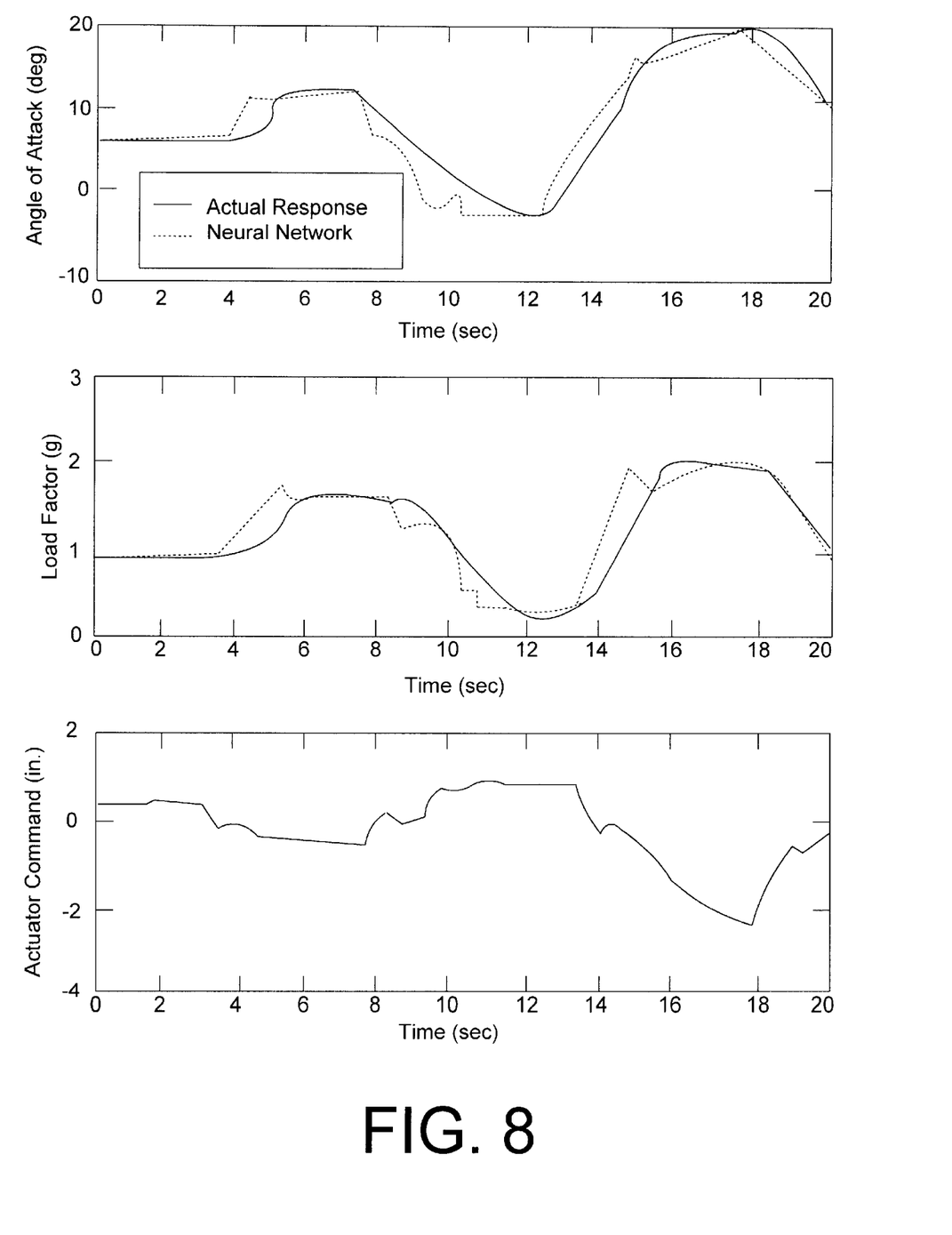
FIG. 8 illustrates the performance of a neural network as can be applied to the system of FIG. 1.

The fact that the network predicts the limited parameters in dynamic trim provides the predictive quality to this approach. It is preferable that the neural network response should lead the aircraft response, so that the network prediction approaches the quasi-steady value of the limited parameter immediately upon the pilot control input, while the actual aircraft will approach the quasi-steady value asymptotically after a period of time as the "fast" transient dynamics die out. FIG. 8 shows an example of the performance of the neural network for the banked turn maneuver of FIG. 7. The neural network response is close to the actual value in the quasi-steady condition, but there are some unwanted dynamics in the transient response of the network due to the response of the longitudinal Stability and Control Augmentation System (SCAS).

The performance of the neural network can be improved by using an optional and complementary filter scheme 22 (FIG. 1) to capture the steady-state component of the elevator actuator command signal. This can be achieved by taking complementary signals from the elevator actuator command, $\delta_e$ and the pilot stick input, $\delta_{long}$.

$$\delta_{e_{CF}}(s) = \delta_e(s) + (G_{ss} - G(s))\delta_{long}(s) \quad (14)$$

The transfer function G(s) is an approximate transfer function of the dynamics of $\delta_e/\delta_{long}$ (S) and $G_{ss}$ is the steady-state component of G(s). The performance of the system with complementary filtered input is shown in FIG. 9 for the same maneuver as in FIG. 8.

Figure 9:
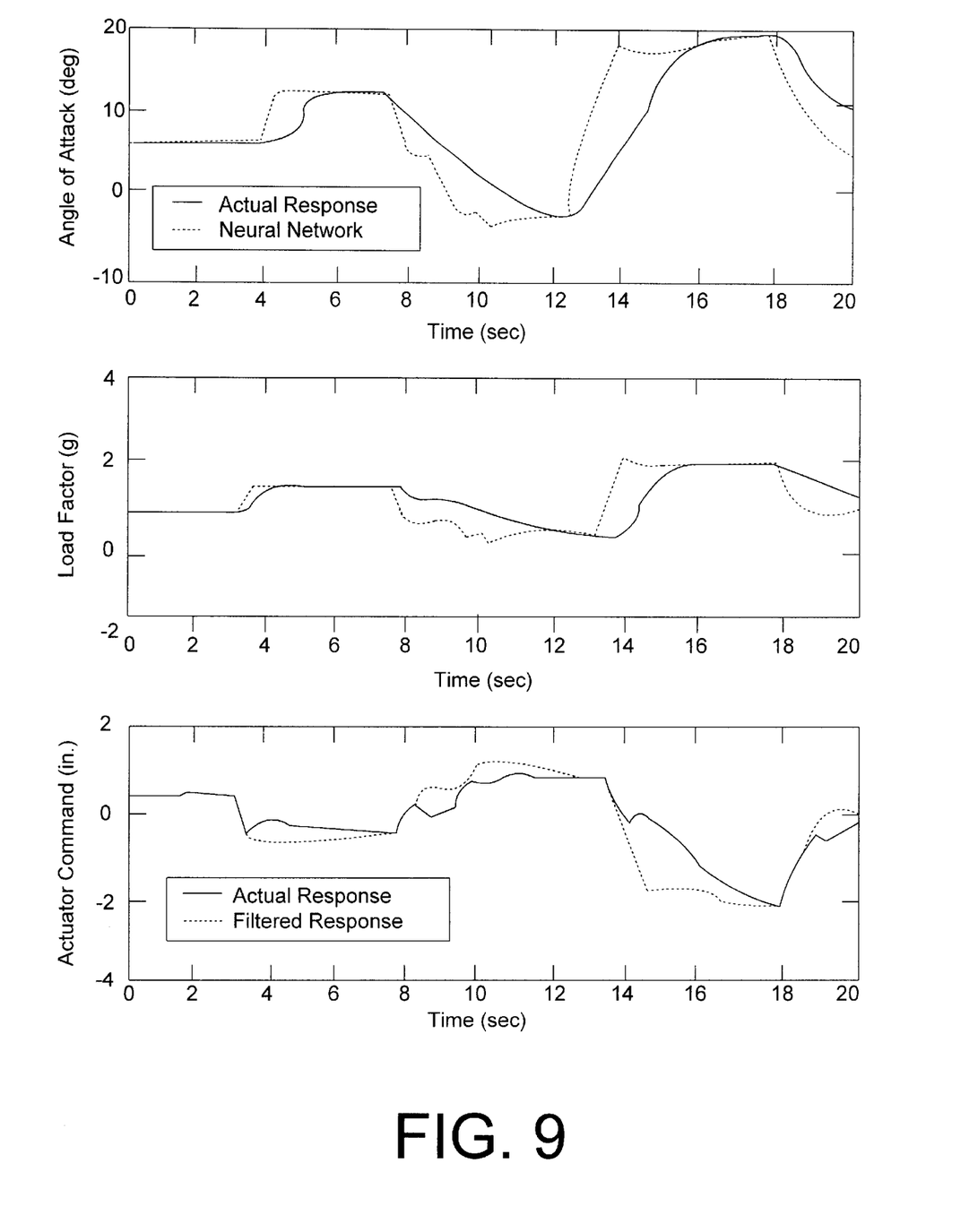
FIG. 9 illustrates the performance of a neural network with an optional filtered input as can be applied to the system of FIG. 1.

The results in FIG. 9 show a desired response. The neural network responds immediately upon the control input and leads the actual response of the aircraft. The response of the neural network and the aircraft converge as the aircraft reaches dynamic trim. The neural networks (for both Equation 7 and Equation 10) can be implemented for a variety of maneuvers to ensure adequate performance. Although the filter transfer function G(s) can vary with flight condition, it was found that one approximate representation was adequate.

Tactile Cueing System

Referring back to FIG. 1, a schematic of the overall limit avoidance system 10 as implemented on the V-22 flight simulator is illustrated. A parabolic increase in longitudinal stick force is imposed as the limit margin parameter approaches zero, thus providing the "soft" stop to cue the pilot of the approaching limit.

For demonstration purposes, only two limits are being examined, and cueing is being provided through the longitudinal axis of the center stick only. It should be noted, however, that the system can handle an arbitrarily large number of limits and provide cueing through any or all of the control inceptors if the proper hardware is available. Additional limits may be added with negligible increase in complexity associated with neural network training.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

We claim:

1. A vehicle performance envelope boundary cueing method for a vehicle control system, said method comprising the steps of:

formulating a prediction system for a neural network; and training said neural network to predict values of limited parameters as a function of current control positions and current vehicle operating conditions.

2. The method of claim 1, wherein said step of formulating a neural network prediction system comprises the steps of:

establishing a functional dependence of said limited parameters in said pre-determined vehicle operating condition with said current vehicle operating conditions and said current control positions; and determining a drive method for predicting a control deflect ion required to drive the vehicle to said limited parameter.

3. The method of claim 1, further comprising the steps of:

applying said neural network to said control system of the vehicle;

measuring conditions;

generating a map of current control positions and vehicle operating conditions versus said limited parameters in a pre-determined vehicle operating condition;

communicating to the vehicle control system a control deflections required to drive the vehicle to a performance envelope boundary; and driving the vehicle control system to provide a tactile cue to an operator of the vehicle as the control positions approach said control deflections.

4. The method of claim 3, wherein said step of measuring conditions further comprises the steps of:

measuring current control positions; and measuring current vehicle operating conditions.

5. The method of claim 4, wherein said step of communicating control deflection further comprises the steps of:

estimating control deflections from said current control positions required to drive the vehicle to a performance envelope boundary; and estimating critical control deflections from said current control positions required to drive the vehicle to said performance envelope boundary.

6. The method of claim 5, wherein said step of estimating critical control deflections from said current control positions required to drive the vehicle to said vehicle performance envelope boundary, comprises the steps of:

generating a linearized representation of said map; and generating a pseudo-inverse of said linearized representation of said map;

wherein said pseudo-inverse of said linearized representation of said map is used in the step of determining critical control deflections from said measurable control positions required to drive the vehicle to said performance envelope boundary.

7. The method of claim 3, wherein said tactile cue comprises a soft-stop imposed on a vehicle controller of said vehicle control system.

8. The method of claim 3, wherein said pre-determined operating condition comprises dynamic trim;

wherein said dynamic trim is defined by vehicle angular acceleration having a value of zero and vehicle angular rate and vehicle transitional acceleration having non-zero values.

9. The method of claim 3, wherein said vehicle control system comprises a force-feel control system.

10. The method of claim 9, wherein said force-feel control system comprises a spring-mass damper system.

11. The method of claim 1, wherein said vehicle comprises a helicopter.

12. A performance envelope boundary cueing method for a vehicle control system, said method comprising the steps of:

providing a neural network trained to predict values of limited parameters as a function of current control positions and current vehicle operating conditions;

providing condition measurements to said neural network;

generating a map of current control positions and operating conditions versus limited parameters in a pre-determined operating condition;

communicating control deflections required to drive the vehicle to a performance envelope boundary to said vehicle control system; and driving said vehicle control system to provide a tactile cue to a controller of said vehicle control system as at least one of said control positions approaches at least one of said control deflections.

13. The method of claim 12, wherein said step of providing a neural network trained to predict values, comprises the steps of:

establishing a functional dependence of said limited parameters in said pre-determined vehicle operating condition with said current vehicle operating conditions and said current control positions;

determining a method for predicting a control deflection required to drive said limited parameter to said performance boundary envelope; and training said neural network to predict values of limited parameters as a function of current control positions and current vehicle operating conditions.

14. The method of claim 12, wherein said step of providing condition measurements to said neural network further comprises the steps of:

measuring said current control position;

communicating said current control position to said neural network;

measuring said current vehicle operating conditions; and communicating said current vehicle operating conditions to said neural network.

15. The method of claim 14, wherein said step of communicating control deflections further comprises the steps of:

estimating control deflections from said current control positions that will result in the vehicle reaching a performance envelope boundary; and estimating critical control deflections from said current control positions required to drive the vehicle to said performance envelope boundary.

16. The method of claim 15, wherein said step of estimating critical control deflections from said current control positions required to drive the vehicle to said performance envelope boundary, comprises the steps of:

generating a linearized representation of said map; and generating a pseudo-inverse of said linearized representation of said map;

wherein said pseudo-inverse of said linearized representation of said map is used in the step of determining critical control deflections from said current control positions required to drive the vehicle to said performance envelope boundary.

17. The method of claim 12, wherein said vehicle control system comprises a force-feel control system.

18. The method of claim 17, wherein said force-feel control system comprises a spring-mass damper system.

19. The method of claim 12, wherein said tactile cue comprises a soft-stop imposed on a vehicle controller of said vehicle control system.

20. The method of claim 12, wherein said pre-determined operating condition comprises dynamic trim;

wherein said dynamic trim is defined by vehicle angular acceleration having a value of zero and vehicle angular rate and vehicle transitional acceleration having non-zero values.

21. The method of claim 12, wherein said vehicle comprises a helicopter.

22. A control system apparatus for providing a tactile cue to a vehicle controller upon continued deflection of the vehicle controller will result in the vehicle approaching a vehicle performance envelope boundary of the vehicle, said apparatus comprising:

a sensor;

a neural network, said neural network being trained to generate a map of current controller positions and vehicle operating conditions versus pre-determined limited parameters in a pre-determined operating condition;

a limit margin estimator, said limit margin estimator determining controller deflections from said current controller positions that will result in the vehicle reaching a performance envelope boundary;

critical limit selection logic, said logic determining critical controller deflections from said current controller positions required to drive the vehicle to said performance envelope boundary; and a controller being tactilely adjustable, wherein deflection of said controller is inhibited as said deflection approaches at least one of said critical control deflections from at least one of said current control positions.

23. The apparatus of claim 22, wherein said sensor further comprises:

a vehicle operating condition sensor; and a current controller position sensor.

24. The apparatus of claim 22, wherein said control system apparatus comprises a force-feel control system.

25. The apparatus of claim 24, wherein said force-feel control system apparatus comprises a spring-mass damper system.

26. The apparatus of claim 22, wherein said pre-determined operating condition comprises dynamic trim.

27. The apparatus of claim 22, wherein said vehicle comprises a helicopter.

28. A vehicle performance envelope boundary cueing system for a vehicle control system, said system comprising the steps of:

measuring means for measuring conditions;

calculation means for generating a map of current control positions and current operating conditions versus limited parameters in a pre-determined operating condition;

communication means for communicating said critical control deflection to the control system of the vehicle; and driving means for driving said vehicle control system to provide a tactile cue to a controller of said vehicle control system which is sensed by an operator of the vehicle as at least on of said current control positions approaches at least one of said critical control deflections.

29. The system of claim 28, wherein said measuring means further comprises:

control measuring means for measuring current control positions; and operating measuring means for measuring current vehicle operating conditions.

30. The system of claim 29, wherein said communication means further comprises:

estimation means for estimating control deflections from said current control positions required to drive the vehicle to a performance envelope boundary; and estimation means for estimating critical control deflections from said current control positions required to drive the vehicle to said performance envelope boundary.

31. The system of claim 28, wherein said calculation means comprises a neural network.

32. The system of claim 28, wherein said pre-determined operating condition comprises dynamic trim.

33. The system of claim 28, wherein said vehicle control system comprises a force-feel control system.

34. The system of claim 33, wherein said force-feel control system comprises a spring-mass damper system.

35. The system of claim 28, wherein said vehicle comprises a helicopter.

36. A vehicle performance envelope boundary cueing method for a vehicle control system, said method comprising the steps of:

predicting future values of a limited parameter of said vehicle as a function of a current control position;

calculating estimates of a control deflection from said current control position which will cause said limited parameter to reach a specified performance envelope boundary at a future time.

37. The method of claim 36, further comprising the step of:

driving a variable force-feel control system of said vehicle to cue an operator of the approaching performance envelope boundary before reaching said performance envelope boundary.

* * * * *